United States Patent
Chen et al.

(10) Patent No.: US 10,572,478 B2
(45) Date of Patent: Feb. 25, 2020

(54) MULTIPLE QUERY OPTIMIZATION IN SQL-ON-HADOOP SYSTEMS

(71) Applicant: NEC Corporation, Minato-ku, Tokyo (JP)

(72) Inventors: Ting Chen, Tokyo (JP); Kazuyo Narita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 15/523,729

(22) PCT Filed: Dec. 1, 2014

(86) PCT No.: PCT/JP2014/082348
§ 371 (c)(1),
(2) Date: May 2, 2017

(87) PCT Pub. No.: WO2016/088281
PCT Pub. Date: Jun. 9, 2016

(65) Prior Publication Data
US 2017/0316055 A1 Nov. 2, 2017

(51) Int. Cl.
*G06F 7/02* (2006.01)
*G06F 16/00* (2019.01)
(Continued)

(52) U.S. Cl.
CPC .... *G06F 16/24542* (2019.01); *G06F 16/2453* (2019.01); *G06F 16/2471* (2019.01); *G06F 2209/5017* (2013.01)

(58) Field of Classification Search
CPC ............ G06F 16/2471; G06F 16/24542; G06F 16/2453; G06F 2209/5017
See application file for complete search history.

(56) References Cited

U.S. PATENT DOCUMENTS 10,242,052 B2 * 3/2019 Mandre ............. G06F 16/24542
2011/0302151 A1 12/2011 Abadi et al.
(Continued)

OTHER PUBLICATIONS

Zhuoyao Zhang et al., "Optimizing Completion Time and Resource Provisioning of Pig Programs", 2012 12th IEEE/ACM International Symposium on Cluster, Cloud and Grid Computing (CCGrid), IEEE computer society, May 16, 2012, pp. 811-816.
(Continued)

*Primary Examiner* — Bruce M Moser

(57) ABSTRACT

To reduce the overall computation time of a batch of queries, multiple query optimization in SQL-on-Hadoop systems groups multiple MapReduce jobs converted from queries into a single one, thus avoiding redundant computations by taking sharing opportunities of data scan, map function and map output. SQL-on-Hadoop converts a query into a DAG of MapReduce jobs and each map function is a part of query plan composed of a sequence of relational operators. As each map function is a part of query plan which is usually complex and heavy, disclosed method creates a cost model to simulate the computation time which takes both I/O cost for reading/writing input file and intermediate data and CPU cost for the computation of map function into consideration. A heuristic algorithm is disclosed to find near-optimal integrated query plan for each group based on an observation that each query plan is locally optimal.

5 Claims, 8 Drawing Sheets

(51) Int. Cl.
*G06F 16/2453* (2019.01)
*G06F 16/2458* (2019.01)

(56) References Cited

U.S. PATENT DOCUMENTS

| | | | |
|---|---|---|---|
| 2011/0302583 A1* | 12/2011 | Abadi | G06F 16/2471 718/102 |
| 2013/0254196 A1 | 9/2013 | Babu et al. | |
| 2013/0298111 A1 | 11/2013 | Koseki et al. | |
| 2013/0326538 A1* | 12/2013 | Gupta | G06F 9/50 718/107 |
| 2014/0215487 A1 | 7/2014 | Cherkasova et al. | |
| 2014/0280032 A1 | 9/2014 | Kornacker et al. | |

OTHER PUBLICATIONS

Yoshifumi Fukumoto et al., "Optimization for Multiple Analysis Jobs on MapReduce", Proceedings of the 3rd Forum on Data Engineering and Information Management, Aug. 4, 2011, DEIM Forum 2011 C3-4.
Kazuhiro Saito et al., "Efficient Query Processing for Data Sharing Multi-Database System", IPSJ SIG Technical Report, Nov. 19, 2013, vol. 2013-DBS-158 No. 6, pp. 1-8.
International Search Report for PCT Application No. PCT/JP2014/082348, dated Feb. 24, 2015.
English translation of Written opinion for PCT Application No. PCT/JP2014/082348.
Japanese Office Action for JP Application No. 2017-527675 dated Apr. 25, 2018 with English Translation.

\* cited by examiner

| | |
|---|---|
| $T_{dr}$ | Cost of reading a page from (H)DFS |
| $T_{lw}$ | Cost of writing a page from local disk |
| $T_{lr}$ | Cost of reading a page from local disk |
| $T_l$ | Sum of $T_{lw}$ and $T_{lr}$ |
| $T_t$ | Cost of transfer a page |
| $T_{op}$ | Cost of processing data by an operator |
| $m$ | # of mapper |
| $r$ | # of reducer |
| $B_m$ | Buffer size for external sorting for mapper |
| $B_r$ | Buffer size for external sorting for reducer |
| $D$ | Merge order for external sorting |
| $o_i$ | # of operators for $D_i$ |
| $|M_i|$ | Size of Map output of Job $i$ |
| $|O_{i_j}|$ | Size of the output of operator $j$ in $D_i$ |
| $|F|$ | Size of the input file of map task |
| $|M_G|$ | Size of Map output of the grouped Job $G$ |

FIG. 3

MULTIPLE QUERY OPTIMIZATION IN SQL-ON-HADOOP SYSTEMS

This application is a National Stage Entry of PCT/JP2014/082348 filed on Dec. 1, 2014, the contents of all of which are incorporated herein by reference, in their entirety.

TECHNICAL FIELD

The present invention relates to the field of database technology, and more particularly to query optimization.

BACKGROUND ART

MapReduce framework has gotten wide interests due to its simple programming model and good scalability across thousands of commodity machines. It allows users to write their own Map and Reduce functions and provides general framework to parallelize such functions. To enable fine-grained fault tolerance, all intermediate data from Map to Reduce are stored in disk. Such characteristic distinguishes traditional database systems which pipeline intermediate data from one operator to another. Hadoop is one implementation of MapReduce model and widely used by the community.

As Map and Reduce functions are written in low-level languages, such as Java in Hadoop, it is troublesome for developers who are not familiar with those languages and difficult to reuse the functions. To simplify the expression of MR programs, many systems provide the support of high-level language (e.g. SQL query) on top of MapReduce framework, such as Hive, Pig, Impala, and Presto. We call them SQL-on-Hadoop systems. Such systems convert an SQL-like query into a DAG (Directed Acyclic Graph) of MapReduce jobs which are then executed by a MapReduce system such as Hadoop one by one.

Some SQL-on-Hadoop systems are targeting to batch processing of queries. Since different queries often perform similar works, much redundant computations are conducted when a batch of queries are executed by the system. For example, multiple MR jobs read the same input file and they can share data scanning to reduce I/O cost. In addition to sharing data scanning, there are also other sharing opportunities among different jobs, such as sharing map outputs and map functions. Thus, it is useful to apply the idea of multiple query optimization to optimize the processing of multiple jobs by avoiding redundant computation in such systems. Multi-query optimization is to group multiple jobs into a single MR job to reduce the overall computation time of all jobs.

There are some existing works proposing some sharing techniques for a batch of MR jobs. They built cost models to estimate whether a system can gain from grouping a batch of MR jobs. Almost all of their cost models only consider sharing of input scan and map output because they think I/O cost dominates the total computational time. They didn't take the sharing of map function into consideration, which makes the model may not be accurate in SQL-on-Hadoop systems where map functions composed of a DAG of relational operators are heavy and cannot be ignored. In addition, a multiple query optimizer in Hive is proposed recently. That work uses rule-based method to rewrite multiple queries into a single insert query which can be executed by Hive. It takes advantages of sharing scan and map function, but the rules for sharing is too simple. They only consider sharing the same join operation and think such sharing is always beneficial.

Therefore, our invention targets to provide a method to optimize multiple queries processed in SQL-on-Hadoop systems. Each map function in SQL-on-Hadoop systems is a partial of overall query plan which is composed of a sequence of several relational operators and the order of some operators can be exchanged. Based on this characteristic, the proposed method defines the problem of optimizing multiple MR jobs as finding optimal groups of MR jobs with optimal query plans within each group. A cost model for overall computational time of a batch of MR jobs is created with consideration of both I/O cost for reading/writing/sorting data and CPU cost for processing the DAGs of relational operators in map functions. To find an optimal integrated query plan within each group, the method generates some rules to reduce search spaces based on the feature that each query plan is locally optimal. Then a greedy algorithm is used to group multiple jobs. In this case, by applying a more accurate cost model, more suitable jobs can be aggregated into a single one and the overall computation time is reduced.

SUMMARY OF THE INVENTION

The method disclosed herein is a multiple query optimization mechanism specially designed for SQL-on-Hadoop systems. Generally, to reduce the overall computation time of a batch of queries, sharing input scans, map output and map functions are taken into consideration to avoid redundant computations. However, almost all existing works only concentrate on sharing scans and map output which yield I/O saving without considering sharing map function which yields CPU saving. While map functions are usually complex and heavy in SQL-on-Hadoop systems, their works may not be efficient. Considering that map functions in SQL-on-Hadoop are a part of query plan represented as a sequence of relational operators most of which can be exchanged, disclosed method defines the problem of multiple query optimization in SQL-on-Hadoop as follows: given a set of MapReduce jobs where each map function is a DAG of relational operators, split the jobs into groups with optimal integrated query plans in each group to minimize the overall computation time of all jobs. To solve the problem, disclosed method creates a cost model to estimate the computation time which takes both I/O costs for data reading, writing, sorting and transferring, and CPU costs for map function processing into consideration. With the cost model, two heuristic algorithms are disclosed to reduce the search space for the problem.

Wherein the disclosed method, a heuristic algorithm for finding near-optimal integrated query plan when merging multiple MR jobs is first disclosed. Based on an observation that each query plan in a single MR job is locally optimal, the algorithm defines two rules: 1, if there is no common operators among multiple query plans, the integrated query plan is generated by simply merging those query plans; 2, if there are multiple common operators, the integrated query plans are generated by sharing a subset or all of them while keeping the order among them. The algorithm first transforms each query plan by dividing a filter operator into several independent ones and exchanging the order of common operators to provide more opportunity of sharing map functions. Then it generates a lot of integrated query plans by merging plans obtained from the transformation based on the rules. Finally, it chooses an integrated query plan with minimum execution time.

Wherein the disclosed method, a greedy algorithm for grouping multiple MapReduce jobs is disclosed. The algorithm iteratively selects a pair of groups of jobs to be merged based on their merging benefit. Each job is initially considered as a single-job group. At each iteration, it merges two groups that generate the most benefit into a new group. The iteration ends when there is no benefit by merging any two groups.

BRIEF DESCRIPTION OF THE DRAWINGS

For a more complete understanding of the invention, reference is made to the following description and accompanying drawings, in which:

FIG. 3 is a diagram illustrating the definition of symbols used in the cost model;

DETAILED DESCRIPTION OF THE PREFERRED EMBODIMENTS

The present invention may be understood more readily with numerous details in the following description of preferred embodiments of the invention and the Figures.

Sharing Opportunity

A. Sharing Opportunity in MapReduce Framework

Among multiple MapReduce jobs, there are a lot of sharing opportunities which can avoid redundant computations. Disclosed method herein identifies the following three kinds of sharing: sharing scans, sharing map output and sharing map functions. Such sharing opportunities are also exploited in other works. Next, we will briefly introduce them.

Sharing Scans.

Figure 1:
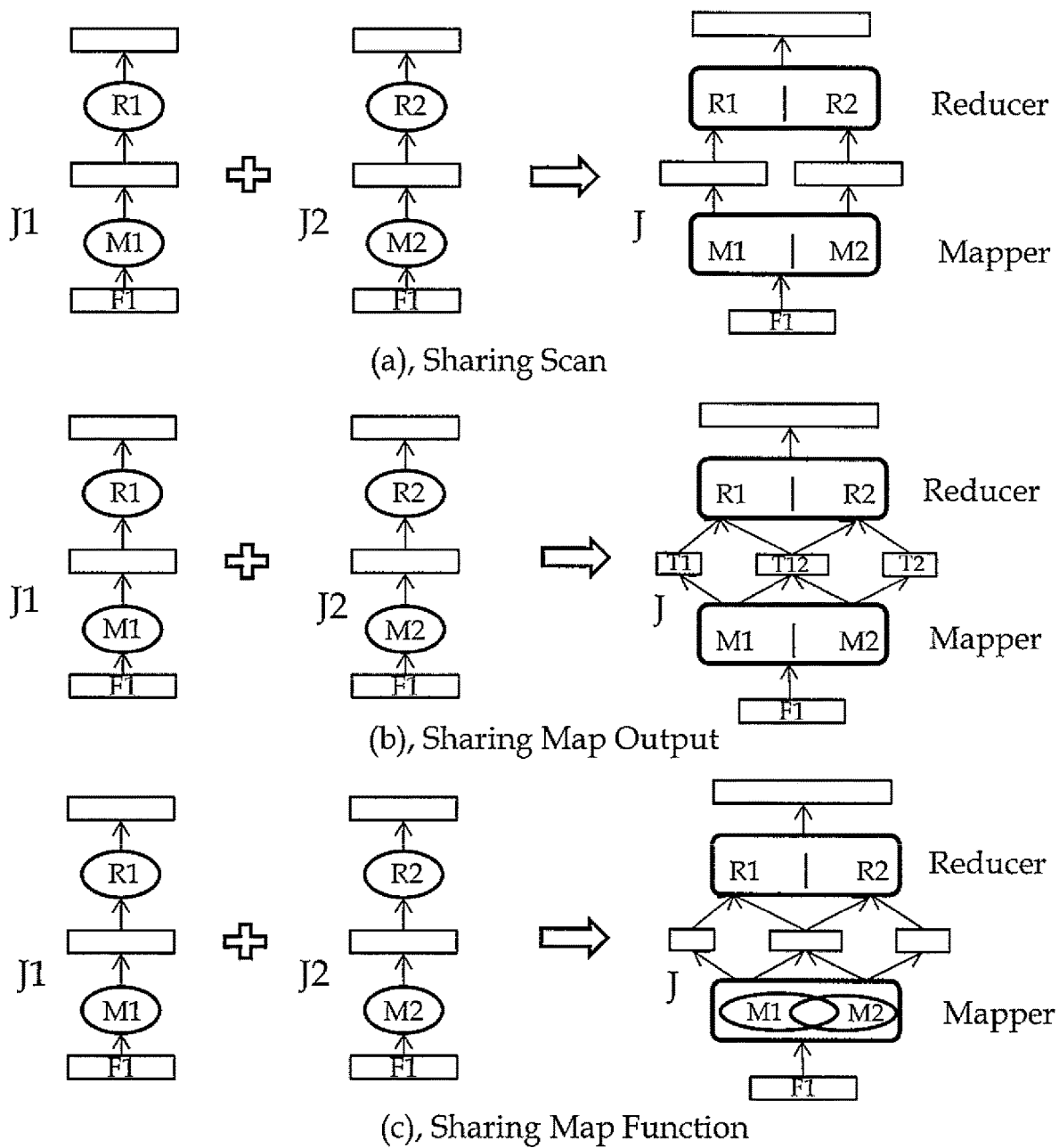
FIG. 1 is a diagram illustrating several sharing opportunities among multiple MapReduce jobs.

Sharing scans can save I/O cost by reducing the number of scans for input files. If two MR jobs $J_1$ and $J_2$ have the same input, grouping them into a single MR job J can share scans. As (a) in FIG. 1 shows, by merging $J_1$ and $J_2$, the input file F1 can be scanned only once. The user-defined map functions $M_1$ and $M_2$ are invoked on the shared file in the merged mapper. Note that, in the merged mapper, two streams of output are produced. To distinguish the streams at the reducer stage, each tuple is added a tag $T_i$ to indicate its origin. For example, the reduce function $R_1$ can read data with tag $T_1$.

Sharing Map Output.

In addition to sharing scans, the map output can be shared too if the map output key and value types are the same for both MR jobs $J_1$ and $J_2$. In this case, $M_1$ and $M_2$ are applied to each input tuple. The outputs that come from only $M_i$ are tagged with $T_i$ while the outputs obtained from both $M_1$ and $M_2$ are tagged with $T_{12}$. Hence, the overlapping parts of the map output can be shared. Producing less map output results can save the overhead on sorting and transferring the intermediate data over the network.

Sharing Map Function.

Sharing common computations between two map functions can yield CPU savings. For example, if $M_1$ and $M_2$ are identical, they can be executed only once. At the end of the map stage, two streams are produced and tagged. If the map output is also shared, only one stream needs to be generated. Sometimes, only a part of functions of the whole one can be shared. For example, each map function performs some filters on data, e.g. $M_1$ is "a>10 and b<100" while $M_2$ is "a>10", thus, the predicate on a can be shared.

Among sharing opportunities mentioned above, sharing scans and map output can yield I/O savings while sharing map function can yield CPU savings. Almost all of existing related works consider that the I/O costs, which are due to reading, sorting, transferring and so on, are usually dominant of the overall computation time. Thus, in their works, they only concentrate on the I/O saving, in other word, sharing scans and map output. However, in SQL-on-Hadoop systems, map function is usually heavy and complicated because it performs most part of the whole query plan. Sharing map function may produce large CPU saving, so only considering I/O savings may not be efficient in such systems. The detail of sharing map function in SQL-on-Hadoop is described in next section. Therefore, disclosed method herein takes both I/O savings and CPU savings into consideration.

B. Sharing Map Function in SQL-On-Hadoop System

As mentioned above, SQL-on-Hadoop systems convert a query into a query plan which is represented as a DAG of MapReduce jobs and each map function is actually a part of query plan which is composed of a sequence of relational operators. As map functions are usually complicated and heavy, it is necessary to share them among multiple MR jobs. If several MR jobs are merged into a single one, an integrated query plan for the merged map function will be generated. As far as we know, most operators such as filter operator, group-by operator and sometimes map-join operators in map functions of SQL-on-Hadoop systems usually can be exchanged with each other without changing the final results. Due to this feature, a large number of integrated query plans can be produced. Thus, how to choose a best one to obtain most benefit becomes a problem.

Figure 2:
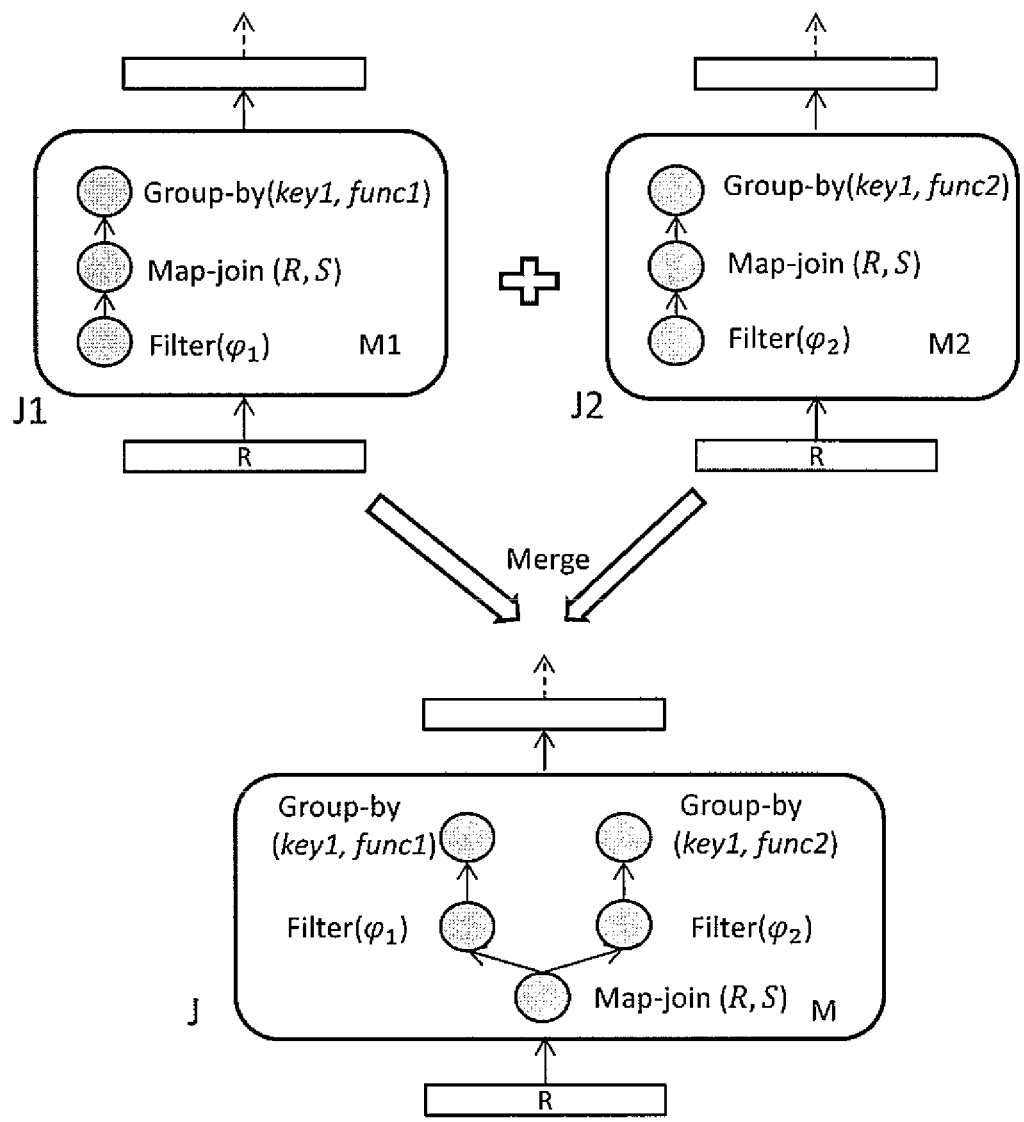
FIG. 2 is a diagram illustrating the special sharing of map function in SQL-on-Hadoop systems.

FIG. 2 shows an example of sharing map function among two MR jobs. The two jobs perform similar computation in their map functions. From bottom to top of the sequence of operators, a filter operator first applies different predicates on the same input data, then same map-join operators are applied to the filtered data and finally the joined data are partially grouped based on same keys but with different functions. To combine these two jobs, the two query plans have to be integrated into a single one. In the example, to share a part of functions, it is better to exchange the map-join operator and filter operator. In this case, the map-join operators can be shared and executed only once. Of course, such sharing of operators may not always be beneficial. For example, if the selections of two filter operators are very low which means that only small number of tuples are selected, it is possible that first performing filter leads to smaller computation time for the integrated query plan. Thus, how to select an integrated query plan with smallest execution time becomes an essential problem which will be described in later sections.

Cost Model

A. Problem Definition

The problem of optimizing multiple MR jobs in SQL-on-Hadoop is different from that in general MapReduce framework. One main reason is that map function in SQL-on- Hadoop is a part of overall query plan of a query which is composed of a sequence of relational operators and some of their order can be exchanged. Thus, there are many candidates for a new query plan by integrating multiple ones. Taking this characteristic into consideration, we define the problem as follows:

Given a set of MapReduce jobs $\{J_1, J_2, \ldots, J_n\}$ where each map function is part of query plan which is a DAG of relational operators $\{D_1, D_2, \ldots, D_n\}$, group the jobs into S groups $\{G_1, G_2, \ldots, G_S | G_i \cap G_j = \emptyset\}$ with optimal execution plans $\{D'_1, D'_2, \ldots, D'_S\}$ to minimize the overall computation time of all jobs.

B. Cost Model

To solve this problem, we need to know which groups of jobs can produce most benefit to the overall computation time than processing jobs separately. Thus, we build a cost model to estimate the overall computation time with consideration of both I/O cost for reading/writing both input and intermediate data and CPU cost for performing map function. The definition of each symbol is shown in FIG. 3.

Generally, a map task includes reading input data from HDFS, computation of the query plan, writing outputs to local disk and externally sorting the outputs. Thus, Map time $T_{M_i}$ is calculated as follows:

$$T_{M_i} = T_{d\_read} + T_{comp} + t_{l\_write} + T_{m\_sort} =$$

$$T_{dr} \cdot |F| + \sum_{j=1}^{O_i} T_{op_j} \cdot |O_{i_{j-1}}| + T_{lw} \cdot |M_i| + T_l \cdot p_{M_i} \cdot |M_i|$$

where the computation time of the query plan is calculated by adding the processing time of each operator which is estimated by the processing time for a tuple multiply the number of input tuples of this operator which is also the output tuples of previous operator. Such calculation is reasonable because we consider the query plan is a sequence of operators which have to be executed one by one. $p_{M_i}$ is the number of sorting passes of map tasks and it equals to $$\log_D \frac{|M_i|}{m \cdot B_m}.$$

A reduce task contains transferring map outputs through network, reduce-side externally sorting merged data and reading local sorted data. Here we didn't consider the computation time of reduce function and the overhead for writing reduce output to disk because such overheads are the same in the case of both grouping and not. Reduce time $T_{R_i}$ is calculated as follows:

$$T_{R_i} = T_{trans} + T_{r\_sort} + T_{l\_read} = T_t \cdot |M_i| + T_l \cdot p_{R_i} \cdot |M_i| + T_{lr} \cdot |M_i|$$

where $p_{R_i}$ is the number of sorting passes of the reduce tasks and it equals to $$\log_D \frac{|M_i|}{r \cdot B_r}.$$

The processing time of a single MR job is calculated as the sum of Map time and Reduce time:

$$T_{J_i} = T_{M_i} + T_{R_i} = T_{dr} \cdot |F| + \sum_{j=1}^{O_i} T_{op_j} \cdot |O_{i_{j-1}}| + (T_l + T_t + T_l \cdot p_i) \cdot |M_i|$$

where $p_i$ is the addition of $p_{M_i}$ and $p_{R_i}$.

Given n MR jobs $\{J_1, \ldots, J_n\}$, the total processing time $T_{JJ}$ without any grouping is calculated as the addition of the processing time of each job:

$$T_J = \sum_{i=1}^{n} T_{J_i} =$$

$$n \cdot T_{dr} \cdot |F| + \sum_{i=1}^{n} \sum_{j=1}^{O_i} T_{op_j} \cdot |O_{i_{j-1}}| + (T_l + T_t) \cdot \sum_{i=1}^{n} |M_i| + T_l \cdot \sum_{i=1}^{n} p_i \cdot |M_i|$$

If n MR jobs are grouped into a single job G, the processing of the grouped job is similar to that of a general MR job. Compared to the processing time of n jobs separately, it only involves reading the input file F once. Unlike computing n query plans in map functions, it processes an optimal integrated query plan $D_{opt}$. Then it handles the output of the map function of G, in other words, the output of $D_{opt}$ not the sum of n map outputs. Thus, the processing time $T_G$ is calculated as:

$$T_G = T_{dr} \cdot |F| + \sum_{j=1}^{O_{opt}} T_{op_j} \cdot |O_{opt_{j-1}}| + (T_l + T_t + T_l \cdot p_G) \cdot |M_G|$$

where $p_G$ is the addition of $$p_{M_G} = \log_D \frac{|M_G|}{m \cdot B_m} \text{ and } p_{R_G} = \log_D \frac{|M_G|}{r \cdot B_r}.$$

Therefore, the original problem becomes to maximize the gain $T_{gain}$ from grouping n MR jobs into S groups $\{G_1, G_2, \ldots, G_S | G_i \cap G_j = \emptyset\}$ with optimal query plans $D' = \{D'_1, D'_2, \ldots, D'_S\}$.

$$T_{gain} = T_J - \sum_{i}^{S} T_{G_i}$$

and $$G, D' = \text{argmax}(T_{gain})$$

Algorithm

A. Heuristic Algorithm for Optimal Query Plan

From the cost model, we can see that to get the overall processing time with grouping technology, it is necessary to know the computation time of optimal integrated query plan. We define the problem of looking for optimal integrated query plan as follows:

Given n query plans D={$D_1, \ldots, D_n$} producing m integrated query plan D'={$D'_1, \ldots, D'_m$}, find an optimal query plan $D_{opt} \in D'$ to reduce the total computation time of all plans.

As mentioned above, the cost for processing a query plan $T_{D'_i}$ is simulated by the following equation:

$$T_{D'_i} = \sum_{j=1}^{o_i} T_{op_j} \cdot |O_{i_{j-1}}|$$

Thus, the problem becomes to find an optimal query plan $D_{opt}$ to minimize the processing time of $T_{D'_i}$:

$$D_{opt} = \operatorname{argmin}(T_{D'_1}, T_{D'_2}, \ldots, T_{D'_m})$$

A heuristic algorithm is used to solve this problem based on an observation. To fully take advantages of existing SQL-on-Hadoop systems, the algorithm receives query plans from the systems which have already been optimized locally. Thus, based on the assumption that each query plan is locally optimal, we define two rules for the integration of multiple query plans.

Rule1: If there is no common operators among multiple query plans, the integrated query plan is generated by simply merging those query plans. Here common operators means operators that can be shared among plans, that is, operators whose output can be used by multiple plans.

Rule2: If there are multiple common operators, the integrated query plans are generated by sharing a subset or all of them while keeping the order among them.

Based on the two rules, we define our algorithm into two parts. The first one is transformation of query plan which converts the current query plan into other equivalent ones. There are two kinds of transformation: Filter Operator Transformation and Shape Transformation.

Filter Operator Transformation. A Filter Operator is to select a subset of data based on some predicates. For a table, there may be many independent intersected predicates on a single of multiple attributes. For example, a Filter Operator has two predicates: col1>10 and col2<40. In this case, we transform this operator into two independent ones: Filter Operator 1 with predicate col1>10 and Filter Operator 2 with predicate col2<40. A single predicate can also be divided into several ones, but we don't consider that in this work. Thus, m predicates can produce m new Filter Operators.

Figure 4:
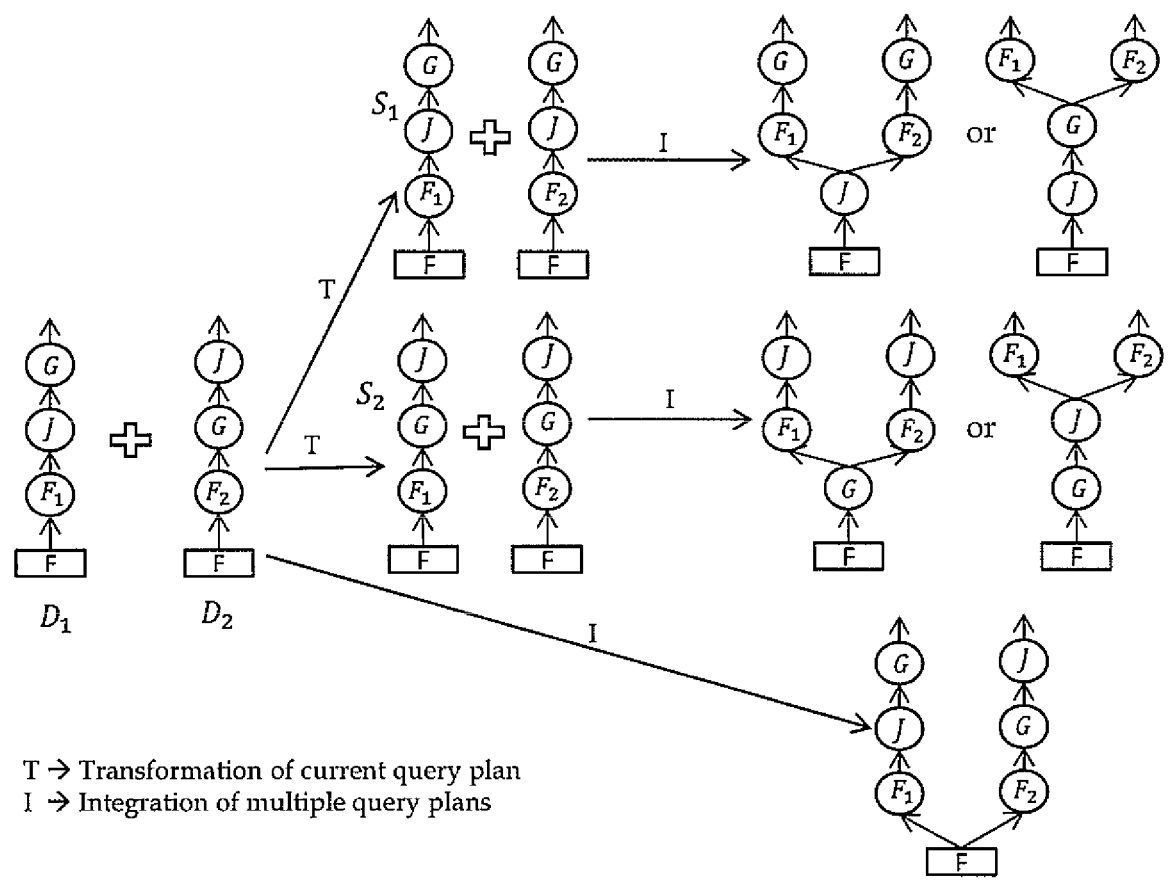
FIG. 4 is a diagram illustrating the transformation and integration phases for finding near-optimal integrated query plan.

Shape Transformation. Each map function contains a tree of operators and the shape of the tree can be changed by exchanging the order of operators. Thus shape transformation is to exchange operators to provide more opportunity of sharing works of map function. First, common operators whose output can be directly used by next operators in multiple Maps should be identified. We denote $C_{ij}$ as the set of common operators between $D_i$ and $D_j$ ($C_{ij} = C_{ji}$). After that, the algorithm selects a query plan $D_i$ corresponding to which other query plan is transformed by exchanging the order of common operators $C_{ij}$ while keeping the same order with $C_{ij}$ in $D_i$. Every query plan will be selected as the base one. Such process can be illustrated by the FIG. 4. Thus for query plan $D_i$, there are n−1 transformations (n is the number of query plans) {$D_{i1}, \ldots, D_{ij}, \ldots, D_{in}$} where $D_{ij}$ means $D_j$ based transformation and j≠i. As a result, we get n set of query plans to be integrated: $S_i = \{D_i, D_{1i}, \ldots, D_{ji}, \ldots, D_{ni}\}$ 1<=i<=n and j≠i.

After the transformation, the algorithm comes to the next step—integration. It integrates a set of query plans obtained from transformation phase into a single query plan. The integration has to be complied to the two rules defined above. For the set of query plans $S_i$ which takes $D_i$ as the base query plan, the integrated query plans depend on the number and order of common operators of $D_i$. The common operators for $D_i$ is the union of $C_{ij}$ where 1<=j<=n and j≠i. For each $C_{ij}$, the algorithm moves a subset or the whole set to the bottom of the tree (data is transferred from bottom to top) and does the same thing to all of other query plans. For example, in FIG. 4, $C_{12}$={J, G} and $S_1$ takes $D_1$ as base query plan. For $S_1$, the algorithm moves operator J or operators {J, G} to the bottom of the tree. Note that, based on Rule2, the order between J and G should be kept. As a result, the algorithm adjusts the shape of query plan of $D_2$ accordingly. Thus, the integrated query plan can share the common operators until an uncommon operator appears. In the example, two candidates of integrated query plans are generated. One candidate only shares the operator J and another one shares both operators {J, G}. Therefore, for a set of $S_i$, $c_i$ candidates of integrated query plans are generated, where $c_i$ is the number of common operators of $D_i$. As a result, there are n×c candidates, where c is the average number of common operators for all query plans. In addition, there is always an integrated query plan by simply combining all query plans because sometimes sharing nothing may have smallest overhead.

Figure 5:
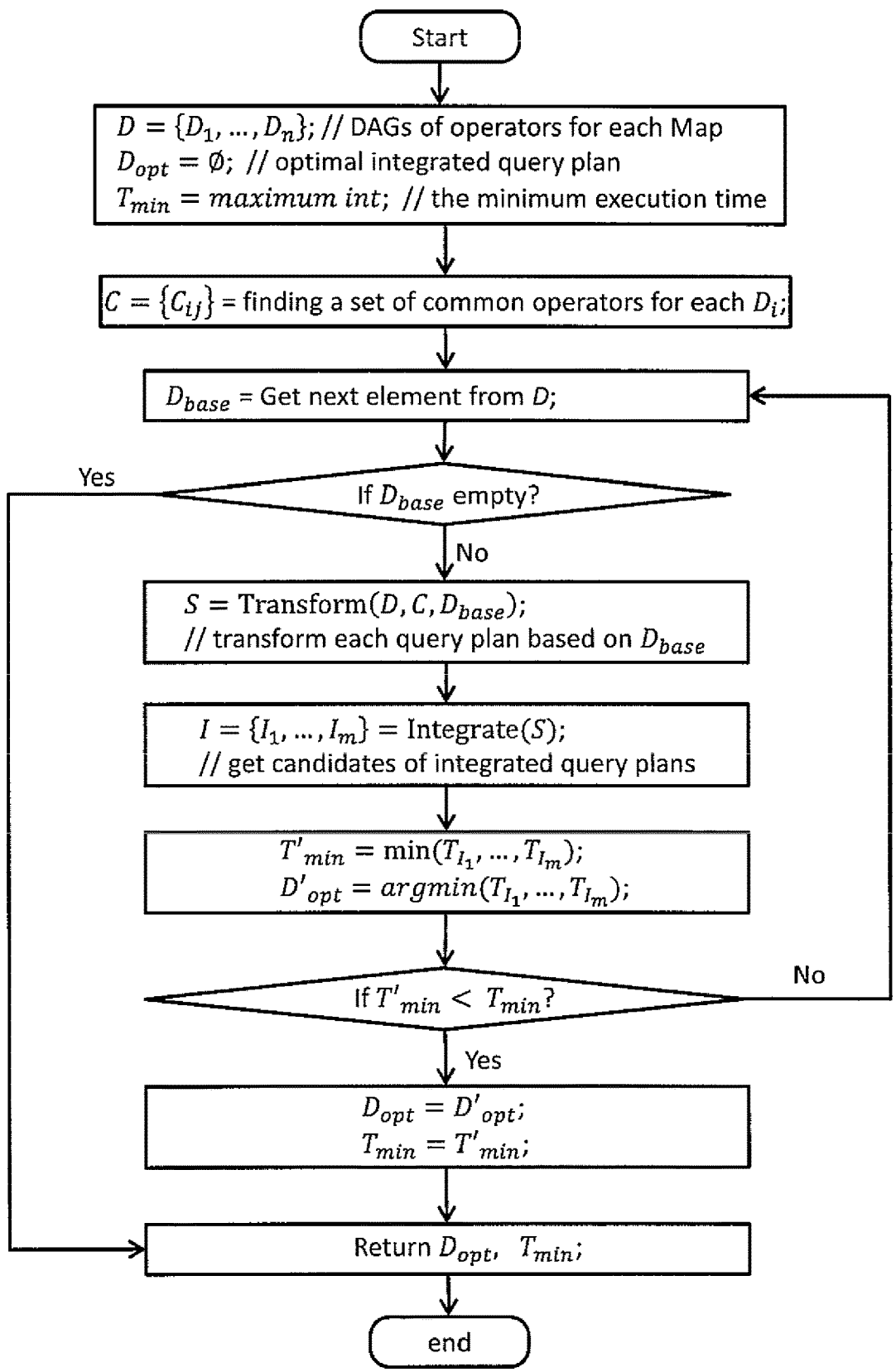
FIG. 5 is a logic flow diagram illustrating a heuristic algorithm for finding near-optimal integrated query plan.

The algorithm is shown in FIG. 5. The input is a set of query plans D={$D_1, \ldots, D_n$} and the output is the optimal integrated query plan $D_{opt}$ with its computation time $T_{min}$. First, the algorithm finds the common operators among query plans. Then, it chooses each query plan as a base plan, then transforms other plans accordingly and get n sets of query plans to be integrated. The detail is described above. Next, it integrates each set of query plans to generate candidates for final integrated query plan. Finally, it selects one integrated query plan from all candidates which has the smallest execution time and returns the query plan and time. The algorithm runs in O(nc) time where n is the number of query plans and c is the average number of common operators. With this heuristic algorithm, a near-optimal solution is found.

B. Greedy Algorithm for Optimal Grouping

Figure 6:
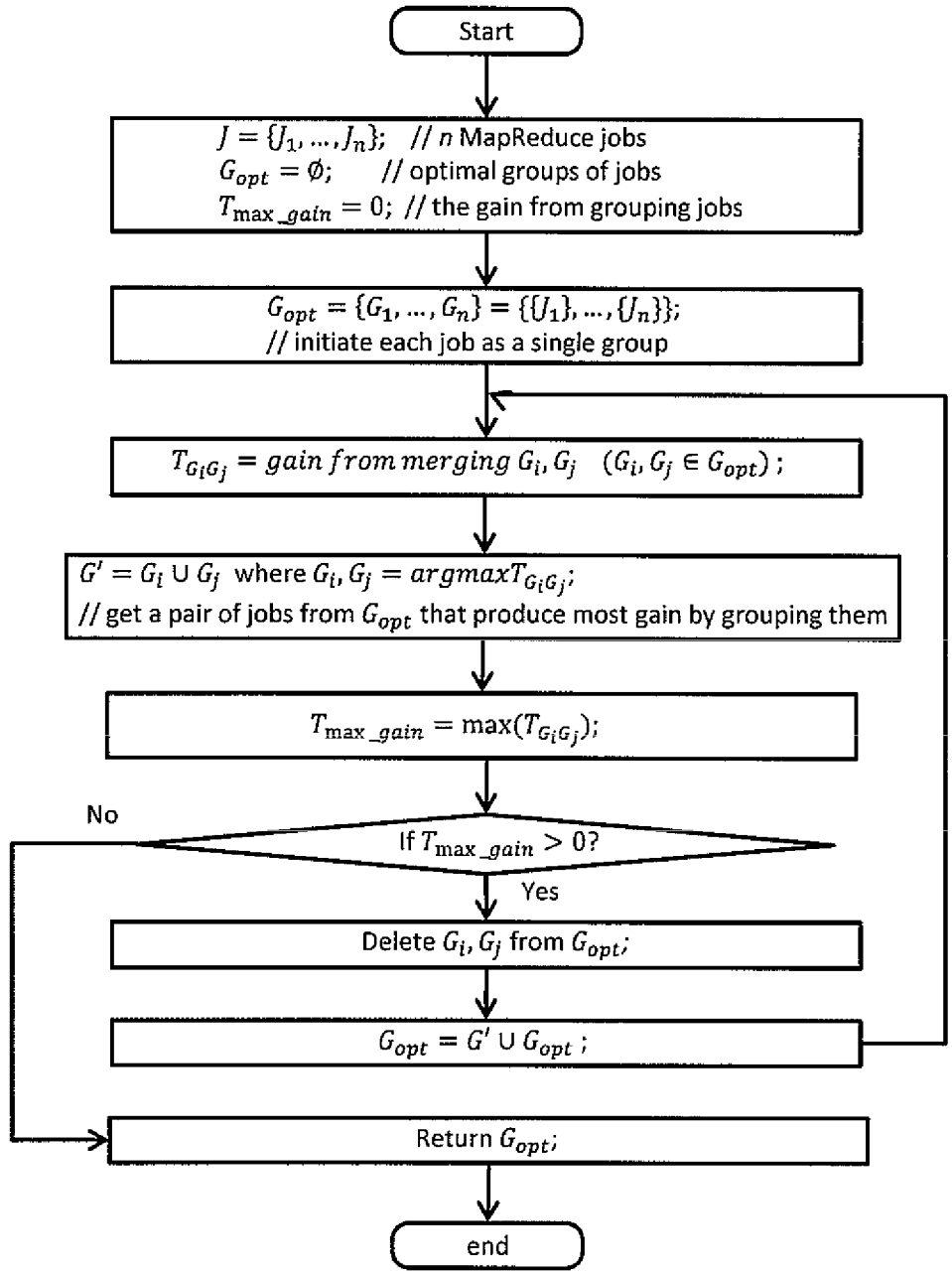
FIG. 6 is a logic flow diagram illustrating a greedy algorithm for grouping multiple MapReduce jobs.

After a near-optimal query plan is generated, next step is to group MR jobs. To reduce the processing time for finding optimal groups, we take a greedy algorithm which also can only find a near-optimal solution. The algorithm is described in FIG. 6. The input is n MapReduce jobs J={$J_1, \ldots, J_n$} and the outputs are groups of jobs $G_{opt}$={$G_1, \ldots, G_S$}. The algorithm works as follows:

Step-1: initiate each job as a single group $G_{opt}$={$G_1, G_2, \ldots, G_n$};

Step-2: calculate the gain of each pair of group $T_{G_iG_j} = T_{G_i} + T_{G_j} - T_{G_i \cup G_j}$ where $G_i, G_j \in G_{opt}$; To calculate $T_{G_iG_j}$, an integrated query plan is generated based on the algorithm described above;

Step-3: find a pair of group $G' = G_i \cup G_j$ that produces most gain $T_{max\_gain}$;

Step-4: add G' into $G_{opt}$ and delete $G_i$ and $G_j$ from $G_{opt}$;

Step-5: repeat Step-2 to Step-4 until $T_{max\_gain}$<0;

Step-6: return $G_{opt}$;

Note that, the first iteration needs $O(n^2)$ to get the pair of groups with maximum merging benefit. The following iterations only run O(n) to calculate the benefit of merging a new group to the previous merged group because at each iteration only one new group is generated. Thus, the time complexity of the grouping algorithm is $O(n^2)$, where n is the number of MR jobs to be grouped.

C. An Example

Figure 7:
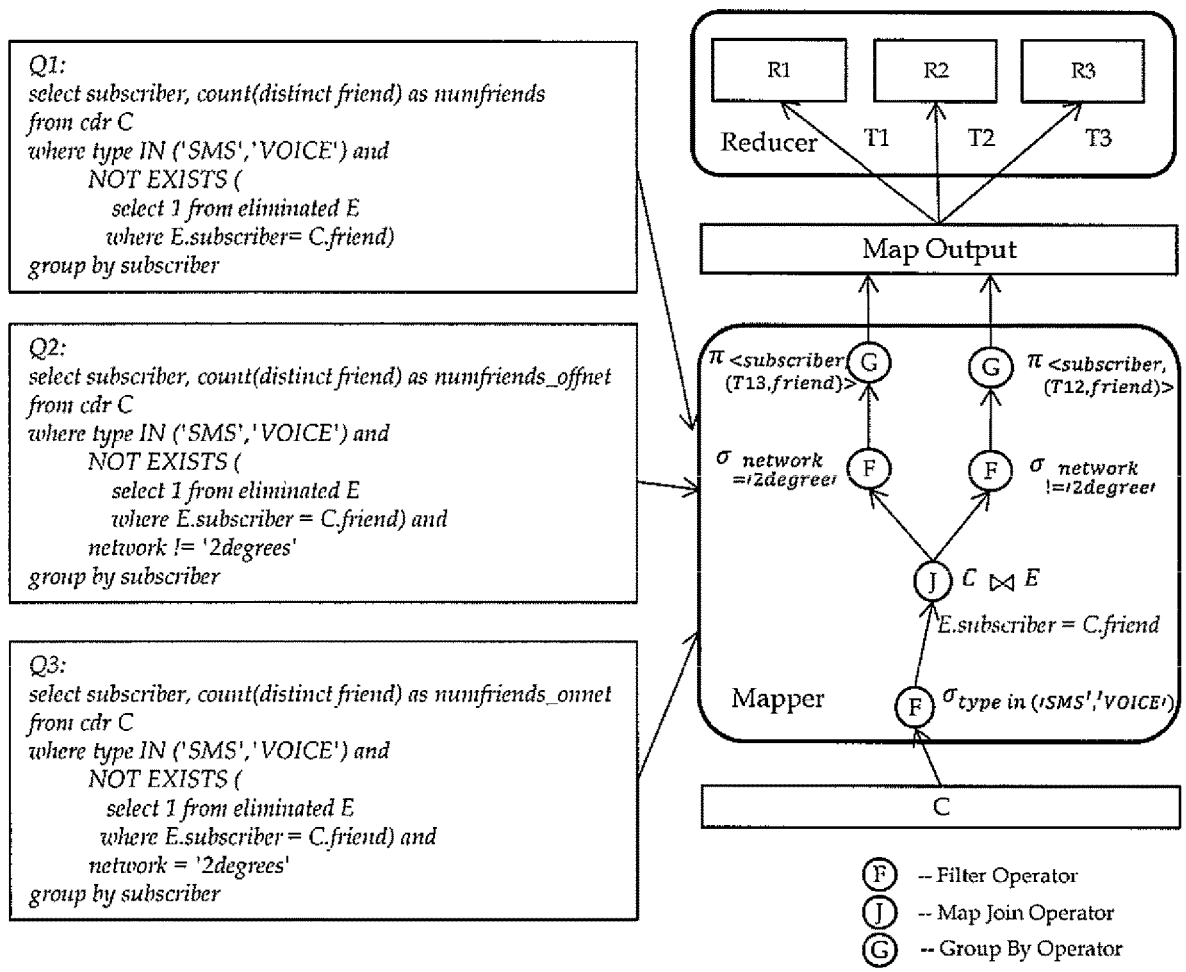
FIG. 7 is a diagram illustrating an example for grouping three MapReduce jobs with disclosed method.

An example of grouping multiple queries is shown in FIG. 7. There are three queries for feature generation from churn analysis. Each query performs an aggregation to a table cdr with different predicates. One common predicate is that friend does not exist in table eliminated. This predicate can be performed by a map-join operation because table eliminated is very small and it is more efficient to distribute it to all Maps. Thus each query is converted into a MR job in which the map function is composed of a filter operator with all predicates, a map-join operator for "NOT EXISTS" computation and a partial group by operator sequentially.

If we group them into a single MR job, with our method, an optimal integrated query plan may be obtained as shown in the right side of FIG. 7. With such grouping, many redundant computations can be saved. First, as three map functions read the same table cdr, scanning of the table occurs only once. Second, the integrated query plan can share two common operators, a filter operator with common predicate of "type in ('SMS', 'VOICE')" and a map-join operator. Finally, results of two group by operators can be shared by the reduce function of first MR job. The map output of Q2 is tagged with T12 which means these data can be used by both R1 and R2 while the map output of Q3 is tagged with T13. The map output of Q1 is actually the combination of the map outputs of Q2 and Q3, thus it is not necessary to produce it twice.

Architecture

Figure 8:
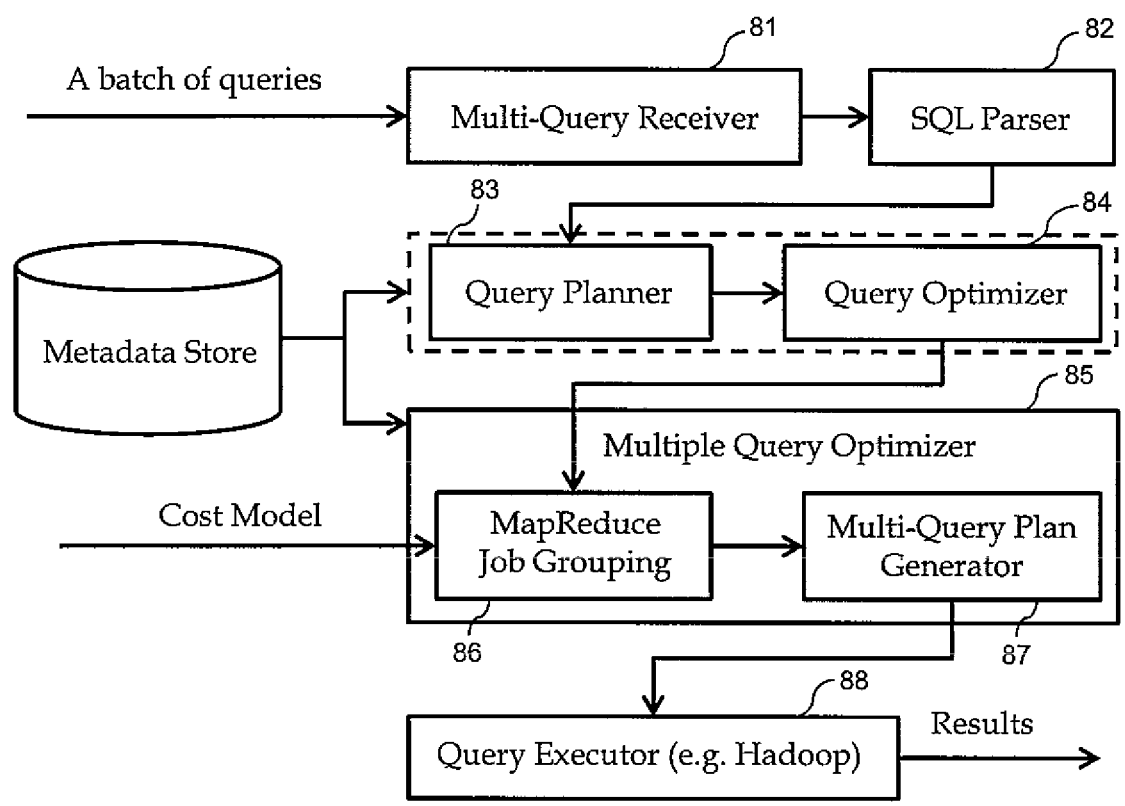
FIG. 8 is a block diagram illustrating the architecture of new SQL-on-Hadoop systems with disclosed method.

The architecture of an SQL-on-Hadoop system with our method is shown in FIG. 8. A batch of queries are issued to the system and cached by Multi-Query Receiver 81. SQL parser 82 is connected between the Multi-Query Receiver 81 and Query Planner 83. Then a query is converted and optimized to a DAG of multiple MR jobs by the Query Planner 83 and Query Optimizer 84 from the existing system. After all queries are converted and optimized, all MR jobs from those queries are sent to Multiple Query Optimizer 85 which firstly splits, by MapReduce Job Grouping 86, them into groups based on our model and then regenerates the query plan by Multi-Query Plan Generator 87. As MR jobs that our Multiple Query Optimizer received are optimized, the map functions which actually are a part of query plans, are considered as locally optimal. Thus, our assumption for the algorithm of finding optimal query plan is correct. Finally, new query plan is executed by Query Executor (e.g. Hadoop) 88 and results are returned to the client.

Disclosed methods are implemented in MapReduce Job Grouping module. First, the cost model is registered to the system. It is easy to replace it with other cost models. Then the module uses the algorithms disclosed here to split the jobs into groups and merge them into several jobs with optimal integrated query plan for each merged job. As a result, some operators may be shared by more than one subsequent operators, which is different from the query plan without multiple query optimization.

What is claimed is:

1. A method for optimizing multiple queries to reduce an overall computation time in SQL-on-Hadoop systems by grouping and merging multiple MapReduce jobs comprising:
   creating a cost model to estimate the overall computation time with grouping technology;
   using a heuristic algorithm to find a near-optimal integrated query plan when merging multiple MapReduce jobs into a single one; and
   using a greedy algorithm to group a set of MapReduce jobs into several groups, wherein the cost model for the overall computation time comprises:
      calculating an execution time of each map job as an addition of a cost for reading an input file, executing map function, writing and externally sorting intermediate data;
      calculating an execution time of each reduce job as an addition of a cost for transferring map output over network, externally sorting or merging the map output and reading the map output to reduce function; and
      calculating an execution time of each MapReduce job as an addition of the execution time for the map and the execution time for the reduce jobs.

2. The method of claim 1, wherein a cost for executing map function is an addition of an overhead of each operator which is estimated by the processing time for a tuple multiply the number of input tuples of the operator.

3. The method of claim 1, wherein an overall computation time of merged multiple MapReduce jobs is calculated as a regular job but the map function is an integrated query plan by merging multiple query plans.

4. The method of claim 1, wherein the heuristic algorithm for finding near-optimal integrated query plan comprises:
   creating integration rules based on the query plan in each map function being locally optimal;
   transforming each query plan into equivalent ones by dividing a filter operator into independent ones and exchanging the order of common operators to provide more opportunity of map function sharing;
   generating candidates of integrated query plans by merging plans obtained from the transformation based on the rules; and
   selecting a candidate of integrated query plan with a minimum execution time from the generated candidates of integrated query plans.

5. The method of claim 4, wherein rules for integrating multiple query plans comprises:
   generating candidates of integrated query plans by simply merging them if there is no common operators among them; and
   generating candidates of integrated query plans by sharing a subset of common operators while keeping the order among them if there are multiple common operators.

\* \* \* \* \*